May 25, 1943.                J. B. LEAKE                2,320,146
                        SAFETY MEANS FOR AIRCRAFT
                        Filed June 22, 1938            2 Sheets-Sheet 1
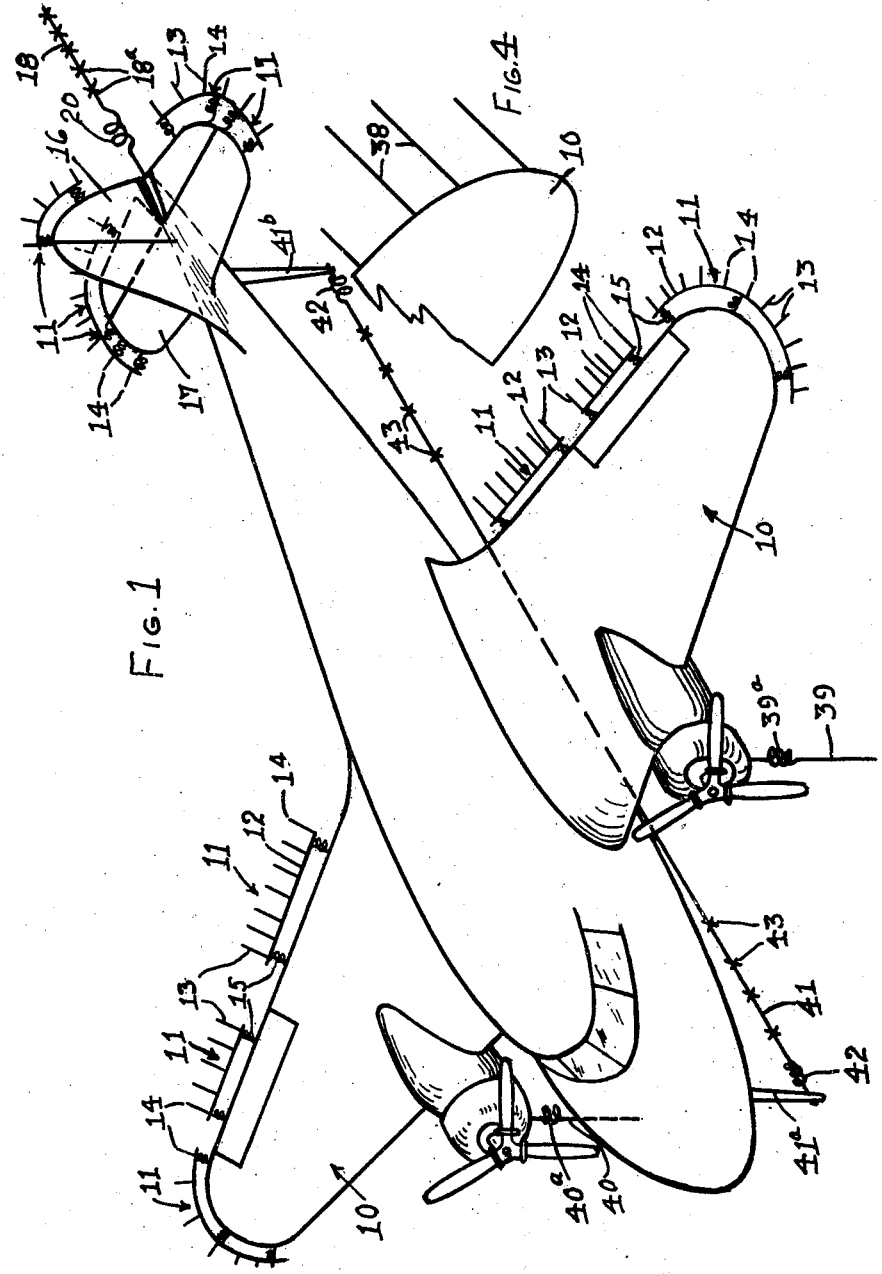
INVENTOR.
JOHN B. LEAKE
BY
Sheridan, Davis and Cargill
ATTORNEY.

May 25, 1943.  J. B. LEAKE  2,320,146
SAFETY MEANS FOR AIRCRAFT
Filed June 22, 1938  2 Sheets-Sheet 2
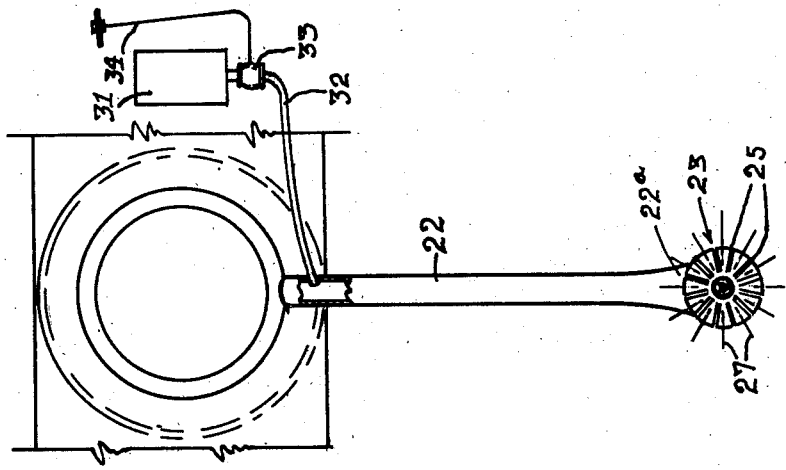
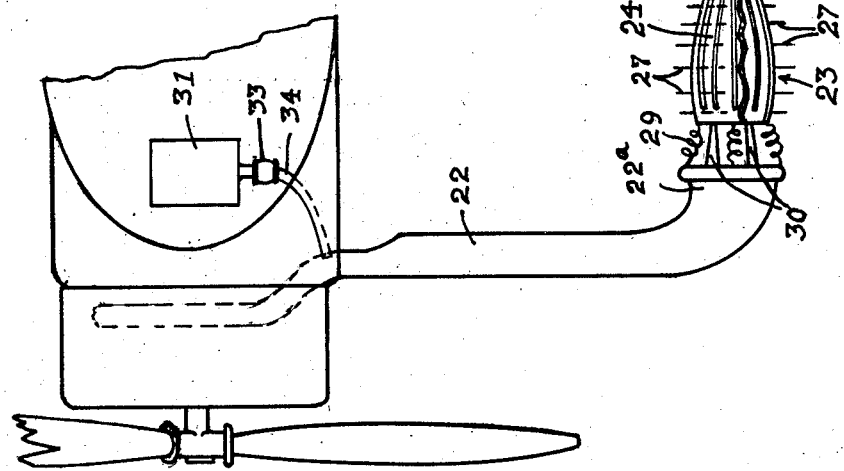
INVENTOR.
JOHN B. LEAKE
BY
Sheridan, Davis and Cargill
ATTORNEY.

Patented May 25, 1943

2,320,146

UNITED STATES PATENT OFFICE 2,320,146

SAFETY MEANS FOR AIRCRAFT

John B. Leake, Maywood, Ill.

Application June 22, 1938, Serial No. 215,105

6 Claims. (Cl. 244—1)

This invention relates to safety means for aircraft.

The relatively frequent destruction of aircraft at or near the crests of mountains or elevations or when flying through static weather conditions with resulting loss of life, is often attributed to failure of the radio equipment or failure of the motors, or to errors or mistakes of the pilots, and investigations following some of such crashes have resulted in no definite conclusions as to the cause or causes of the disasters.

The noted similarity of the physical conditions, that is, of weather and topography, under which many of such crashes have occurred, indicates that the reported failure of the radios just prior to the disasters and also the not infrequent reports that the engines were misfiring leads to the conclusion that some other primary cause has resulted in the failure or improper functioning of radios and engines and that such primary cause of such failure of radios and engines becomes effective under certain natural conditions which often become acute as the planes approach the crests of elevations or mountains or come close to the ground or electrically charged clouds.

It has heretofore been observed that modern metal streamlined planes, which are practically devoid of sharp edges, exposed points, and other mechanical and structural devices which were characteristic of fabric covered planes of a few years ago, gather large charges of static electricity during flight, especially where their courses are through rain, sleet, or snow storms, fog or through dust laden atmosphere, or near a cold front. The static charges collected by such planes may have a voltage of several hundred thousand volts of either the positive or the negative sign. Such static charges may become so high that they result in observable corona at the edges of the propellers, and other parts of the plane.

The static charges accumulated by aircraft may be distributed generally throughout the metal body of a plane during flight at usual elevations, but such charges of either the plus or minus sign may be suddenly concentrated at certain portions of the plane when subjected to the influence of charges of the opposite sign. Such influencing charges may be present in clouds through or near which a plane passes or in topographical elevations, trees, or the like, on hill tops over which the plane passes at a clearance which is much less than its elevation of flight over less rough terrain. If a plane, passing through storms or dust, collects a high charge of static and thereafter approaches a hill or mountain top, the static charge may shift from the wing structure and portions of the fuselage and be concentrated in that portion of the plane nearest the source of the opposite charge, that is, generally near the lower forward portion of the plane. Such shifting of the static charge may be sufficient to affect the compass of the plane and cause it to be piloted from the proper course and possibly into a mountain peak. The concentration of the static charge under the influence of a charge of opposite sign may so increase the density and voltage of the charge at a particular portion of the plane that static discharge or corona will take place which will interfere with the proper functioning of the radio equipment. Under the conditions mentioned, therefore, the sudden impairment of the radio of a plane which but a few moments before may have been functioning properly, is explainable.

As such discharge of accumulated static occurs due to the attraction of a charge of opposite sign, as mentioned, the air is ionized. Such ionization of air which is drawn into the carburetor may result in reduction of engine efficiency, that is, the loss of power with consequent loss of altitude, resulting in the crashing of the plane in tree tops at the crest of a high hill or mountain. Such reduction of engine efficiency by reason of static discharges where the charge is concentrated at the lower, forward portion of the plane, as the plane approaches the crest of a mountain, may follow as a natural result of the ionizing effect of the static discharge or from other effects of the static concentration. It is known that electrically charged sand will cause coalescence into droplets of vapor particles in the air and that ions in vapor under reduced pressure will have a similar effect, for example. The static discharges or corona from portions of a plane, being no different in nature from the charges of the illustrations given, may likewise have similar effects.

Should the ionization of air from heavy discharges of static occur at or near the carburetor intake of a plane and such air be drawn into the carburetor and thus impair the vaporization of the fuel or cause condensation or coalescence of the gasoline vapor, the efficiency of the engine would be decreased with accompanying tendency to lose speed and altitude. Should such effect on the engine power be sufficient, the sudden loss of altitude or inability to maintain the rate of climb, could result in a crash at or near the crest of an elevation, accompanied or preceded by the failure of the radio, as above mentioned. Irregular running of the engine, due to the above conditions could also cause destructive vibration in the aircraft structure or excessive splashing of gasoline in the fuel tanks.

It is an object of the invention to provide means for effecting the discharge from aircraft of static collected in flight not only to prevent detrimental effect of static on the operation of the radio but to preclude reduction in engine efficiency under conditions where an accumulated static charge tends to concentrate in a portion of a plane near the motor or intake thereof and to discharge therefrom due to the attraction of a charge of opposite sign.

It is another more specific object of the invention to provide means for enabling static charges accumulated by aircraft during flight to leak off more or less gradually, but without substantial interference with the operation of the radio apparatus of the craft.

A further object of the invention is to facilitate the discharge of static from a plane by providing for the injection into the heated exhaust gases of chemical substances which reduce the voltage at which such accumulated static can be discharged.

Another object is to promote discharge of static from the plane by the provision of wires or points, some of which may be of pure metal and others of metal oxides to provide for the leakage of static of either sign at relatively low voltage.

In the accompanying drawings I disclose structures illustrative of the invention, wherein:

Fig. 1 is a perspective view of a typical airplane equipped with static discharge means embodying the present improvements;

Fig. 2 is a broken side elevation of another form of static discharge device;

Fig. 3 is a broken end elevation of the structure shown in Fig. 2; and

Fig. 4 is a broken perspective view of a plane wing showing an additional form of static discharge means.

In Fig. 1 of the drawings, the aircraft illustrated is shown as provided at the wings 10 with static discharge devices indicated generally by the numeral 11. The devices 11, in the form illustrated, comprise conductors, wires, or strips 12 to which are electrically connected a plurality of shorter fine wires 13 preferably terminating at their free ends 14 in sharp points. The members 12 are electrically connected to the trailing edges of the metal wings preferably by high frequency suppressors 15 which may be in the form of choke or resistance coils. Charges of static collected by the plane in flight is, under normal conditions, more dense at the relatively thin trailing edges and ends of the wings, and consequently is more readily dissipated from such locations. The leakage of the static from the plane through members 11 as it is picked up during flight is facilitated by the use of the thin and preferably pointed wires 13, whereby there is utilized the phenomenon frequently referred to as the "discharging effect of points." Not only is the plane shown in Fig. 1 provided with members 11 on the wing structure, but also such members are shown at the rudder 16 and horizontal portions 17 at the tail. The upper and lower portions of the forward end or nose of the plane are likewise equipped with the discharge devices which may well be provided at other portions of the plane also. A plurality of fine discharge wires or points 13 preferably is employed, since the discharge of a relatively heavy amperage from a single or a few discharge wires creates electromagnetic disturbances which may affect reception by the radio of the plane. A suitable number of fine discharge wires or points permits the static charge to leak off more or less continuously under lower potential, and hence avoids generation of disturbing electromagnetic waves and precludes the accumulation of a charge of such volume that, upon approach of the plane to an oppositely charged body, it will surge or shift under attraction of such body to a portion of the plane and then, due to density and/or potential of the charge, by corona suddenly impair the operation of the radio or the engine.

As illustrated in Fig. 1, the tail of the plane may be provided with a trailing pointed wire 18, considerably longer than the points 13 and provided with a high frequency suppressor therein. This wire 18 is shown as provided with numerous outwardly directed dissipating points 18a. The suppressor may comprise a choke coil 20 which will conduct static to the discharge point of the wire, but which damps out the high frequency to the plane and oscillations set up by the discharge which disturbances otherwise might be carried back to the metal of the plane and radiate radio frequency disturbances.

The engine or engines of the plane and the cowls thereof likewise are provided with static discharge devices which may be in the form referred to above or they may be of a form to provide a discharge system enveloped by the ionized hot gases from the engine exhaust, thus increasing their static discharge effectiveness by reducing the discharge voltage, and preventing the accumulation of ice on the discharge system. As illustrated in Figs. 2 and 3, an exhaust tube or pipe 22 depends from the engine structure and terminates in an enlarged outlet 22a from which the hot ionized gases are discharged into and through a static discharge device indicated generally by the numeral 23. This device may be in the form of a hollow metal shell 24, open at the ends and provided with a suitable number of slots or openings 25 therein which constitute exits for the gases and create sharp edges from which static is dischargeable at relatively low potential. The shell 24, as shown, may be provided also with numerous sharp points 27 which further facilitate the constant leakage of static in quantities which do not materially affect the operation of the radio of the plane.

The device 23 is electrically connected to the discharge pipe 22 by suppressors, such as resistances or choke coils 29, and may be supported in the position shown by any suitable insulating means 30. Being subjected to the hot ionized exhaust gases, the member or members 23 will enable the static to leak off at lower potentials than the breakdown voltage of the air and being located at lower, forward portions of the plane, receive and discharge any surge of accumulated static that may occur due to the approach of the plane toward an oppositely charged body such as the crest of a hill or mountain, tree tops, or the like, and prevent corona from points in the vicinity of the engine air intake, such as from propellers, cowling, or the like.

For the purpose of facilitating static discharge at low potential, the discharge points may be enveloped with ionized air by means other than the hot exhaust gases of the engine, or into the hot gas may be injected known substances which facilitate static discharge from points or other discharge members which may be either pure metal conductors or may be coated with certain compounds which augment their natural discharging characteristics.

Ion concentration to further reduce the discharge voltage of the static may be increased by the use of certain salts which are dissociated by heat, such as sodium chloride, for example, which may be introduced as solids or solutions into the hot exhaust gases or other flame provided for that purpose. In Fig. 3, a receptacle 31 for such ion-forming substances is shown from which extends a tube 32 having a valve 33, by means of which such substances can be directed into the gases of the exhaust pipe 22. A valve operating member 34 is shown diagrammatically for selective discharge of such substance at the will of the pilot.

The member 23, as shown in Fig. 2, may be provided also with trailing pointed wire 35 preferably provided with a suppressor coil 36 and also outwardly directed points 37 for facilitating static discharge as mentioned above.

Some of the points 27 may be formed of pure metal, such as iron and others of an oxide, for example, whereby static charges of either sign will be discharged at low potentials. It will be observed that the trailing discharge wires 18 and 35 include coiled suppressors which provide longitudinal resiliency to the wires which, under the stresses encountered during flight, cause sufficient spring action to prevent bridging over the coils with ice and impairment of their suppressing functions. The location of the discharge device 23 and the associated points 27, suppressor 29 and discharge wire 37 adjacent the discharge end of the exhaust pipe 22 keeps the same free from the accumulation of ice during flight and thereby maintains them in condition for discharging static at minimum potentials.

In Fig. 4, a wing structure is shown having fine wires 38 extending from the trailing edge thereof, no suppressor being shown in this modification.

In Fig. 1, are shown dissipating members 39, 40, and 41 located beneath the plane which may be employed in lieu of the heated dissipating members shown in Figs. 2 and 3. The members 39 and 40 are pendent pointed wires preferably provided with suppressors 39a, 40a which enable the static to leak off at low potential. The member 41 is disposed longitudinally of the plane beneath the same and connected at the ends thereof by conductors 41a, 41b and provided with suppressors 42. This wire is sufficiently small in diameter to enable static to leak therefrom due to the small curvature thereof and may be provided with intermediate points 43 for facilitating static dissipation.

What I claim as new and desire to secure by Letters Patent is:

1. The combination with a motor driven aircraft of static dissipating members electrically connected to the craft and disposed in position to be heated by and enveloped by ionized gases from the motor exhaust.

2. The combination with a motor driven aircraft of a static dissipating member comprising a plurality of fine gauge conductors electrically connected with the craft and disposed in position to be heated by the exhaust gases of the motor thereof.

3. The combination with an aircraft of a static dissipating member electrically connected to said craft, and means for heating said member during flight.

4. The combination with a radio equipped aircraft of a static-dissipating member heated and enveloped by ionized exhaust or other combustion gases, and means electrically connecting said member to the craft comprising a high frequency current suppressor.

5. The combination with a radio equipped motor-driven aircraft having a motor exhaust pipe, of static dissipating means comprising a hollow conducting member provided with a plurality of static dissipating formations located in a position to be heated by the hot gases discharged by said pipe, and means electrically connecting said member to the chart comprising a high frequency current suppressor.

6. The combination with a motor driven aircraft, of a downwardly projecting exhaust pipe for said motor, and a static dissipating device electrically connected to said craft and positioned adjacent the outlet of said pipe to be subjected to the ionizing effect of the exhaust gases of the motor.

JOHN B. LEAKE.

CERTIFICATE OF CORRECTION.

Patent No. 2,320,146. May 25, 1943.

JOHN B. LEAKE.

It is hereby certified that error appears in the printed specification of the above numbered patent requiring correction as follows: Page 3, second column, line 43, claim 5, for "chart" read --craft--; and that the said Letters Patent should be read with this correction therein that the same may conform to the record of the case in the Patent Office.

Signed and sealed this 24th day of August, A. D. 1943.

Henry Van Arsdale,
Acting Commissioner of Patents.

(Seal)